United States Patent [19]

Smith

[11] Patent Number: 5,677,912
[45] Date of Patent: Oct. 14, 1997

[54] DIAGNOSTIC DEVICE FOR A COMMUNICATIONS SWITCHING SYSTEM

[75] Inventor: Paul D. Smith, Joliet, Ill.

[73] Assignee: Rockwell International Corporation, Downers Grove, Ill.

[21] Appl. No.: 826,724

[22] Filed: Jan. 28, 1992

[51] Int. Cl.⁶ .................................................. G06F 11/00
[52] U.S. Cl. .................................. 371/20.1; 370/218
[58] Field of Search ................................. 371/20.1, 15.1,
371/20.3, 29.1, 22.1, 29.5, 16.1; 370/13,
17, 53, 216, 218; 375/10; 395/575

[56] References Cited

U.S. PATENT DOCUMENTS

| | | | |
|---|---|---|---|
| 3,829,627 | 8/1974 | Short et al. | 179/175 |
| 4,412,282 | 10/1983 | Holden | 364/200 |
| 4,455,622 | 6/1984 | Lorskom et al. | 364/900 |
| 4,594,480 | 6/1986 | Betton | 179/175 |
| 4,680,784 | 7/1987 | Lehnert et al. | 379/11 |
| 4,821,267 | 4/1989 | Dregh et al. | 371/20.1 |
| 4,926,363 | 5/1990 | Nix | 371/20.1 |
| 4,937,850 | 6/1990 | Borbas et al. | 379/6 |
| 4,945,554 | 7/1990 | Krause et al. | 379/10 |
| 4,964,124 | 10/1990 | Burnett | 371/29.1 |
| 4,975,938 | 12/1990 | Hayes | 379/11 |
| 5,208,846 | 5/1993 | Hammond et al. | 379/15 |

*Primary Examiner*—Phung Chung
*Attorney, Agent, or Firm*—Welsh & Katz, Ltd.

[57] ABSTRACT

A diagnostic device for a port interface equipment (32) of a communications switching system (12), and at least one digital console (34) having a device (10) for selectively monitoring the communications data passing to either the port interface equipment (32) or the digital console (34) without affecting the communications data passing therebetween, and a device (42) for selectively and removably connecting the monitoring device between the port interface equipment (32) and a selected digital console (34) in order to monitor the communications data passing therebetween.

11 Claims, 3 Drawing Sheets

DIAGNOSTIC DEVICE FOR A COMMUNICATIONS SWITCHING SYSTEM

BACKGROUND OF THE INVENTION

The present invention relates to diagnostic devices for communications switching systems.

In the past, communications switching systems, such as telephone switching systems, have been known. The switching systems may provide communications data to and from a plurality of remote digital consoles at the location of the user. Although such systems have operated satisfactory, under certain conditions it is desirable to check the data passing to and from the digital console to and from the communications system in order to verify that it is in proper operating order, and to also make any repairs which may be necessary or desirable in either the communications switching system or the digital console. In the past, there has been no satisfactory monitor to check the system without affecting the communications data which is being verified.

SUMMARY OF THE INVENTION

A principal feature of the present invention is the provision of an improved diagnostic device for a port interface equipment of a communications switching system, and at least one digital console.

The diagnostic device of the present invention comprises, means for selectively monitoring the communications data passing to either the port interface equipment or the digital console, and means for selectively and removably connecting the monitoring means between the port interface equipment and the digital console.

A feature of the present invention is that the monitoring means does not affect the communications data passing between the port interface system and the digital console.

Another feature of the present invention is that the monitoring means may be connected between the port interface equipment and a selected digital console.

Yet another feature of the invention is that the monitoring means may be utilized to monitor and verify the communications data passing between the port interface equipment and the selected digital console.

A further feature of the invention is that the monitored communications data may be displayed for a user of the system.

Another feature of the invention is that the monitored communications data may be supplied to a printer to form a permanent copy of the data.

Still another feature of the invention is that the communications data may be supplied to a computer for storage of the data and later use of the data.

Yet another feature of the invention is that the communications data may be formed into an audio signal.

A further feature of the invention is that the audio information may be supplied to a listening device in order to hear the communications data.

Yet another feature of the invention is that the direction of the monitoring means relative to the port interface equipment or digital console may be selected by the monitoring means.

Still another feature of the invention is that the communications system may comprise a telephone communications switching system.

Yet another feature is that the monitoring means may be connected between the port interface equipment and digital console in a simplified manner.

Another feature of the invention is that the monitoring means may be utilized in order to verify proper communications between the communications switching system and the selected digital console.

Still another feature of the invention is that the monitoring means may have a computer to store and process the communications data.

Further features will become more fully apparent in the following description of the embodiments of this invention, and from the appended claims.

DESCRIPTION OF THE PREFERRED EMBODIMENTS

Figure 1:
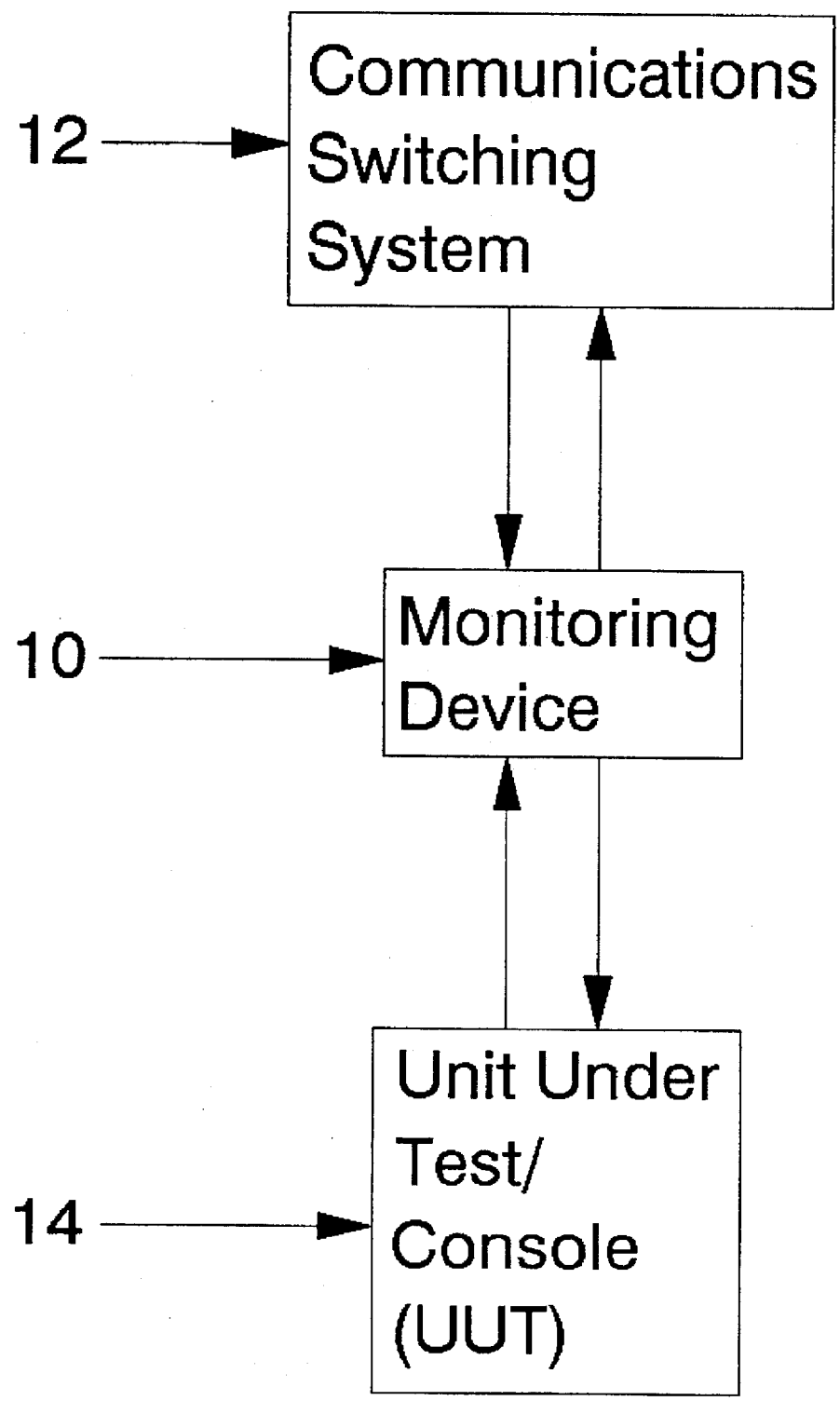
FIG. 1 is a block diagram of a communications system and a monitoring or diagnostic device of the present invention.

Referring now to FIG. 1, there is shown a digital console interface monitor or diagnostic device generally designated 10 of the present invention for removable connection between a communications switching system generally designated 12 and a unit under test (UUT) or digital console generally designated 14. The communications switching system 12 may comprise any suitable switching system, such as the telephone switching system GALAXY, a trademark of Rockwell International Corporation, Pittsburgh, Pa. As will be seen below, the diagnostic device 10 is utilized to tap into the communications link between the switching system 12 and UUT 14 in a non-circuit affecting manner in order to monitor the communications for trouble shooting of any communications link problems. The diagnostic device 10 may monitor the communications link in either direction without affecting the communications between the switching system 12 and UUT 14, and the resulting communications data may be placed on a suitable display for viewing by an operator of the system, or may be printed out in order to obtain a permanent copy of the communications data.

Figure 2:
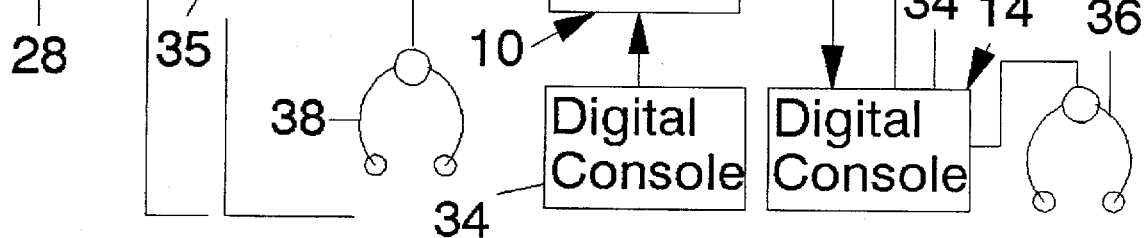
FIG. 2 is a block diagram of the monitoring device as utilized in the communications system and a plurality of digital consoles.

As shown in FIG. 2, the communications switching system 12 forms a part of a main switching system 16 which is connected to a 1.544 mc digital interface (T1) which may have 24 channels of pulse code modulation (PCM) signals or data. In turn, the PCM channels of the digital interface 18 are connected to a channel service unit (CSU) 20 which formats the data to U.L. standards.

The main switching system 16 is connected to rented communication lines 22, such as wires or fiber optics, having a multiplexing equipment 24 (MUX EQU) which combines the data of multiple T1's 18, after which the resulting data is sent for some distance over the rented lines 22 to a remote unscramble circuit (MUX EQU) 26 for recovering the multiplexed data of the T1 18.

The data from the rented lines 22 is then connected to a remote site 28 having another channel service unit (CSU) 30 which formats the data, as previously described in connection with the CSU 20. The information in turn is connected to a port interface equipment 32 which breaks up the data of the T1 18 into separate channels, such as 24 individual channels 1, 2, 3, ... 22, 23, and 24. A plurality of digital consoles 34 are located at the actual user interface 35 of the equipment, and are individually connected to the separate channels of the port interface equipment 32. The digital consoles 34 may be of the type of consoles termed PROVIEW, ISS, GVS, or CALL POWER, trademarks of Rockwell International Corporation, Pittsburgh, Pa. As shown, each of the consoles 34 may have suitable listening devices 36, such as headphones, for hearing audio information produced by the digital consoles 34. As shown, the digital monitors or diagnostic devices 10 may be removably connected to any of the channels between the port interface equipment 32 and any of the multiple digital consoles 34 in order to monitor the communications between the port interface equipment 32 and the selected digital console 34 without affecting communications between the port interface equipment 32 and the corresponding digital console 34. As will be discussed below, the interface monitors 10 have the capability of generating audio signals for suitable listening devices 38, such as headphones, in order to monitor audio PCM data generated by the interface monitor 10.

Figure 3:
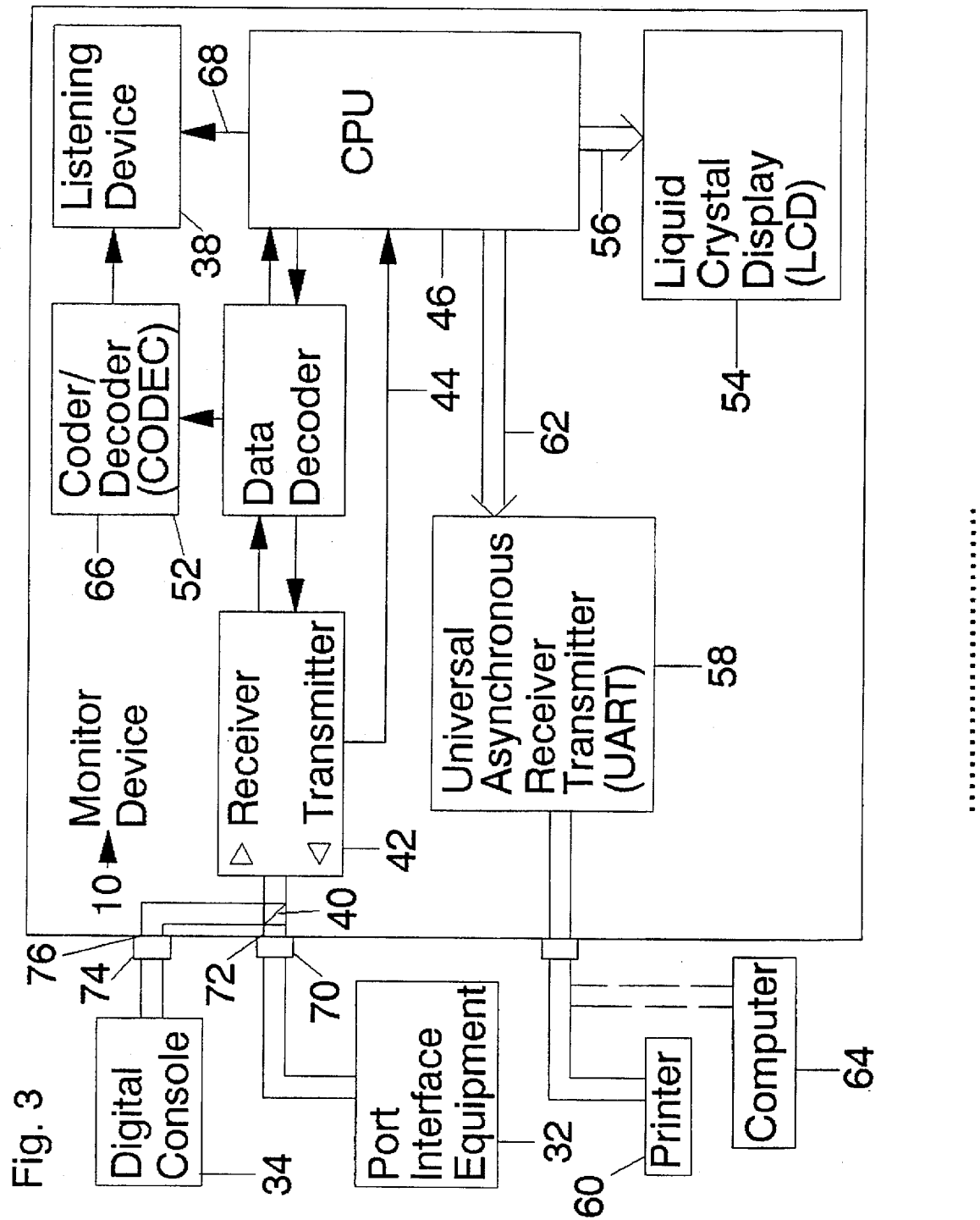
FIG. 3 is a block diagram of the monitoring device of the present invention.

As shown in FIG. 3, the diagnostic device 10 has a receiver/transmitter 42 removably connected to and from the port interface equipment 32 by a suitable device, such as a plug 70 in a port 72, and removably connected to and from the selected digital console 34 selected for monitoring by a suitable device, such as a plug 74 in a port 76, with the receiver/transmitter 42 being bridged across a four wire system. Two of the four lines are connected to the port interface equipment 32, and two of the four lines are connected to the selected digital console 34. The diagnostic device 10 is tapped into the 4 wire system while isolating the system, such as by suitable transformers in the diagnostic device 10. Also, the diagnostic device 10 has its own power supply, such that monitoring of the system does not affect communications between the port interface equipment 32 and selected digital console 34. The device 10 may have a switch 40 in order to select either the two lines 48a and 48b connected to the port interface equipment 32, or the two lines 50a and 50b connected to the digital console 34 for monitoring. The receiver/transmitter 42 indicates which of the two separate lines have been selected by generating an appropriate signal which is passed over a line 44 connected to a computer 46 or a Central Processing Unit (CPU) having a Read Only Memory (ROM) and a Random Access Memory (RAM). The receiver/transmitter 42 also amplifies the signals on both lines 48a and b and 50a and b depending upon which of the two line sets is being monitored. In this manner, the switch 40 may be utilized in order to select the direction in which the system should be monitored.

As shown, the data from the receiver/transmitter 42 passes in serial form to a data decoder 52 which recovers a clock signal and the digital data from the proprietary link, with the decoder 52 serving as an input/output (I/O) device for the CPU. The decoder 52 includes a phase lock circuit which forms a clock signal associated with the data which is supplied to the CPU and also internally to the decoder 52. The decoder 52 also supplies the data in serial form to the CPU, and indicates to the CPU whether the clock has been recovered, and whether the data is satisfactory.

The data decoder 52 is connected to a coder/decoder (CODEC) 66 which converts the supplied PCM signals to an audio signal. The audio signals are connected to an audio monitor or listening device 38, such as the headphones previously discussed, in order to monitor the data through the use of the audio information. The CPU is also connected to the CODEC 66 over a line 68 in order to inhibit the CODEC 66 in the event that the audio information is not in synchronism.

In turn, the CPU converts the recovered data from serial form to parallel form, and may supply the data in parallel form to a Liquid Crystal Display (LCD) 54 over a bus 56, such that the data may be visually monitored on the display 54 by an operator of the system. The parallel data from the CPU is also supplied over a bus 62 to a Universal Asynchronous Receiver Transmitter (UART) 58 which converts the data in parallel form to serial form, and supplies the serial data in a form suitable for a printer 60, and, if desired, to another computer 64 to store and process the data for later use.

In this manner, the diagnostic device 10 may be connected between the port interface equipment 32 of a communications switching system and a selected digital console 34. The data may be processed by the device 10 without affecting communications, and may be displayed or printed in hard copy form in order to analyze the communications data to determine possible communications problems in a simplified and efficient manner.

The foregoing detailed description has been given for clearness of understanding only, and no unnecessary limitations should be understood therefrom, as modifications will be obvious to those skilled in the art.

What is claimed is:

1. A diagnostic device for a port interface equipment of a communications switching system, and said device having at least one digital console, comprising:

means for selectively monitoring a communications data passing to either the port interface equipment or the digital console without affecting the communications data passing therebetween; and means for selectively and removably connecting the monitoring means between the port interface equipment and a selected digital console in order to monitor the communications data passing therebetween, and including means for selecting a direction of monitoring between either the port interface equipment or the selected digital console in a telephone communications switching system.

2. The device of claim 1 including means for processing the data, and means for indicting the direction of monitoring to the processing means.

3. The device of claim 1 including means for processing a information, and means for passing the information in serial form to the processing means.

4. The device of claim 3 wherein the processing means includes means for converting the data to parallel form.

5. The device of claim 4 including means for supplying a parallel information to a display.

6. The device of claim 4 including means for converting a parallel information into serial form, and means for supplying a serial data to a printer.

7. The device of claim 6 including means for supplying the serial data to a computer.

8. The device of claim 1 including means for processing the communications data, and means for forming a clock signal for the processing means.

9. The device of claim 1 including means for displaying the communications data.

10. The device of claim 1 including means for printing the communications data.

11. The device of claim 1 including means for storing the communications data in a memory of a computer.

* * * * *